United States Patent [19]

Bernhard

[11] 4,182,504

[45] Jan. 8, 1980

[54] BALANCED SNUBBER APPARATUS

[75] Inventor: Frank L. Bernhard, Salt Lake City, Utah

[73] Assignee: E-Systems, Inc., Dallas, Tex.

[21] Appl. No.: 902,910

[22] Filed: May 5, 1978

[51] Int. Cl.² .......................... F16L 3/10; F16F 15/02
[52] U.S. Cl. ................................. 248/49; 248/74 R; 248/602
[58] Field of Search .................. 248/49, 54 R, 58, 59, 248/62, 70, 185, 354 H, 354 S, 357, DIG. 1, 358 R, 184, 15, 18, 20, 26; 138/106, 107, 74 R, 602

[56] References Cited

U.S. PATENT DOCUMENTS

| 163,838 | 6/1875 | Baker | 248/184 X |
|---|---|---|---|
| 464,231 | 12/1891 | Robinson | 248/184 X |
| 2,106,956 | 2/1938 | Nakamura | 248/49 |
| 2,335,833 | 11/1943 | Wood | 248/54 R |
| 2,447,830 | 8/1948 | Wood | 248/54 R |
| 3,430,645 | 3/1969 | Stalph | 248/54 R X |
| 4,046,169 | 9/1977 | Pollono et al. | 248/54 R X |

FOREIGN PATENT DOCUMENTS

| 121054 | 3/1946 | Australia | 248/184 |
|---|---|---|---|
| 772344 | 10/1934 | France | 248/54 R |
| 306725 | 7/1955 | Switzerland | 248/20 |

Primary Examiner—Rodney H. Bonck
Attorney, Agent, or Firm—Robert V. Wilder

[57] ABSTRACT

An apparatus for axial support and shock suppression of a pipe includes a walking beam having an inner portion secured to the pipe and an outer portion. The inner and outer portions of the walking beam are pivotally interconnected above an axis extending through the centerline of the pipe. A pair of support members are pivotally connected to the outer portion of the walking beam on opposite sides of the pipe so that longitudinal loads to the pipe are reacted without effecting a bending moment in the pipe. In the preferred embodiment, a rigid strut and a yieldable snubber device comprise the support members.

6 Claims, 2 Drawing Figures

BALANCED SNUBBER APPARATUS

BACKGROUND AND SUMMARY OF THE INVENTION

The present invention relates to an apparatus for supporting an elongate member. More particularly, this invention concerns a balanced snubber apparatus for suppression of longitudinal shock in a pipe, conduit or the like without inducement of bending forces.

The proper mounting and support of pipes conveying fluids involves several problems. Both static and dynamic loads must be equalized. The static load comprises primarily the weight of the pipe and the weight of the fluid carried therein. The dynamic load typically comprises the forces produced by movement of the fluid, together with any vibration caused by machinery. In addition, allowance must be made for temperature expansion of the pipe. Pipes conveying heated fluids are thus supported semi-rigidly to allow some movement.

In some situations the possibility of shock or impulse loads must also be taken into account in the design of pipe supports. For example, consider the extensive and large-scale piping systems utilized in a power plant. In some geographical areas, it is necessary to provide for shock suppression to the pipe in the event of an earthquake, earth tremor, blast or other emergency. Provision for pipe shock suppression is especially critical in a nuclear power plant. The pipes must be supported in a way permitting some movement, while not allowing the destructive type of movement otherwise caused by shock to a semi-rigidly supported structure.

Suppression of shock in the axial direction of a pipe is especially difficult to achieve without interfering with the natural movement of the pipe and without causing undesirable reaction forces in the pipe. The prior art approaches to this problem include using pairs of parallel snubbers or shock absorbers, one snubber being located on each side of the pipe. If only one snubber is located parallel to the pipe, the snubber force reaction to a shock induces differential bending in the pipe. Two snubbers located on opposite sides of the pipe minimize the bending moment induced, but only if the snubbers are cross-coupled or precisely matched in performance. Matching of snubber performance is not reliable on a long term basis, while cross-coupling of parallel snubbers reduces reliability and requires additional maintenance. There is thus a need for an improved snubber support for longitudinally suppressing the shock in a pipe without effecting a bending moment in the pipe.

The present invention comprises a balanced snubber device to overcome the foregoing and other problems associated with the prior art. In accordance with the broader aspects of the invention, a walking beam structure is secured to a pipe. The walking beam structure is pivoted about an axis extending through the centerline of the pipe. Two support members are pivotally connected to the walking beam structure on opposite sides of the pipe so that longitudinal loads to the pipe are reacted without causing a bending moment therein. The invention permits natural axial movement of the pipe but anchors the pipe in place upon a shock to minimize damage. Only one conventional snubber is employed in the present invention, thereby eliminating the problems of snubber matching or cross-coupling characteristic of the dual snubber devices of the prior art. Use of the snubber device of the present invention reduces maintenance expense and enhances reliability.

In accordance with more specific aspects of the invention, a balanced snubber device for axially supporting a pipe or conduit includes a walking beam assembly having an inner portion pivotally mounted within an outer portion. The inner portion of the walking beam assembly is adapted to be clampingly secured to the pipe, and preferably between upper and lower sets of shear lugs on the pipe. The axis of the pivotal connection between the inner and outer portions of the walking beam assembly extends through the centerline of the pipe. Two parallel support members are coupled between a suitable base and the outer portion of the walking beam in opposing relationship. The support members are coupled to the walking beam assembly at points displaced from the pivotal connection between the inner and outer portions of the assembly. One support member comprises a rigid link. The other support member comprises a conventional snubber or shock absorber. The snubber permits ordinary, expected longitudinal displacement of the pipe, but locks in the event of an unexpected sudden shock force to stabilize the pipe. All reaction forces by the balanced snubber apparatus of the present invention are directed through the centerline of the pipe so that no bending moments are induced in the pipe.

DESCRIPTION OF THE DRAWINGS

A more complete understanding of the invention can be had by reference to the following Detailed Description when taken in conjunction with the accompanying Drawings, wherein.

DETAILED DESCRIPTION

Figure 2:
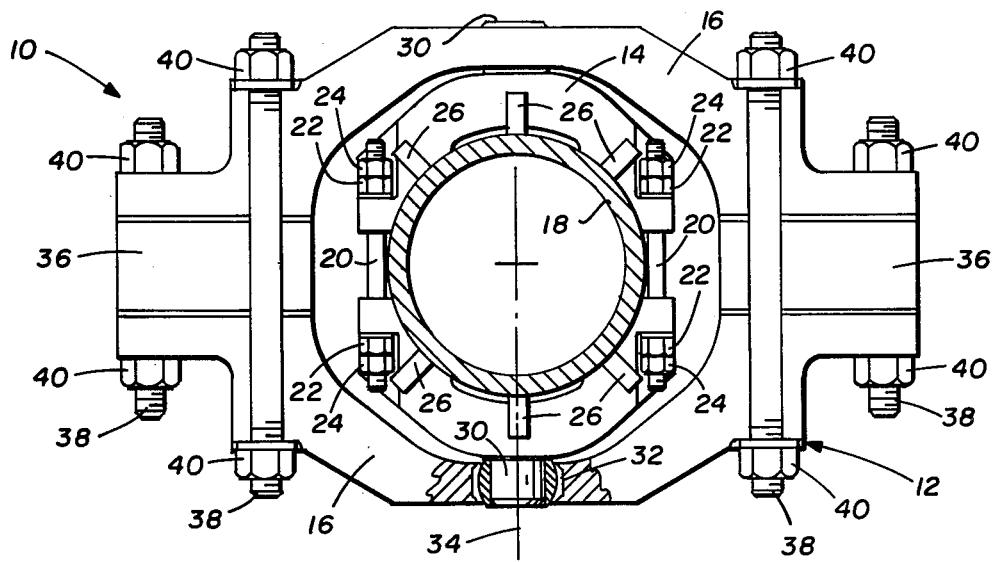
FIG. 2 is a top plan view of the apparatus shown in FIG. 1.
Figure 1:
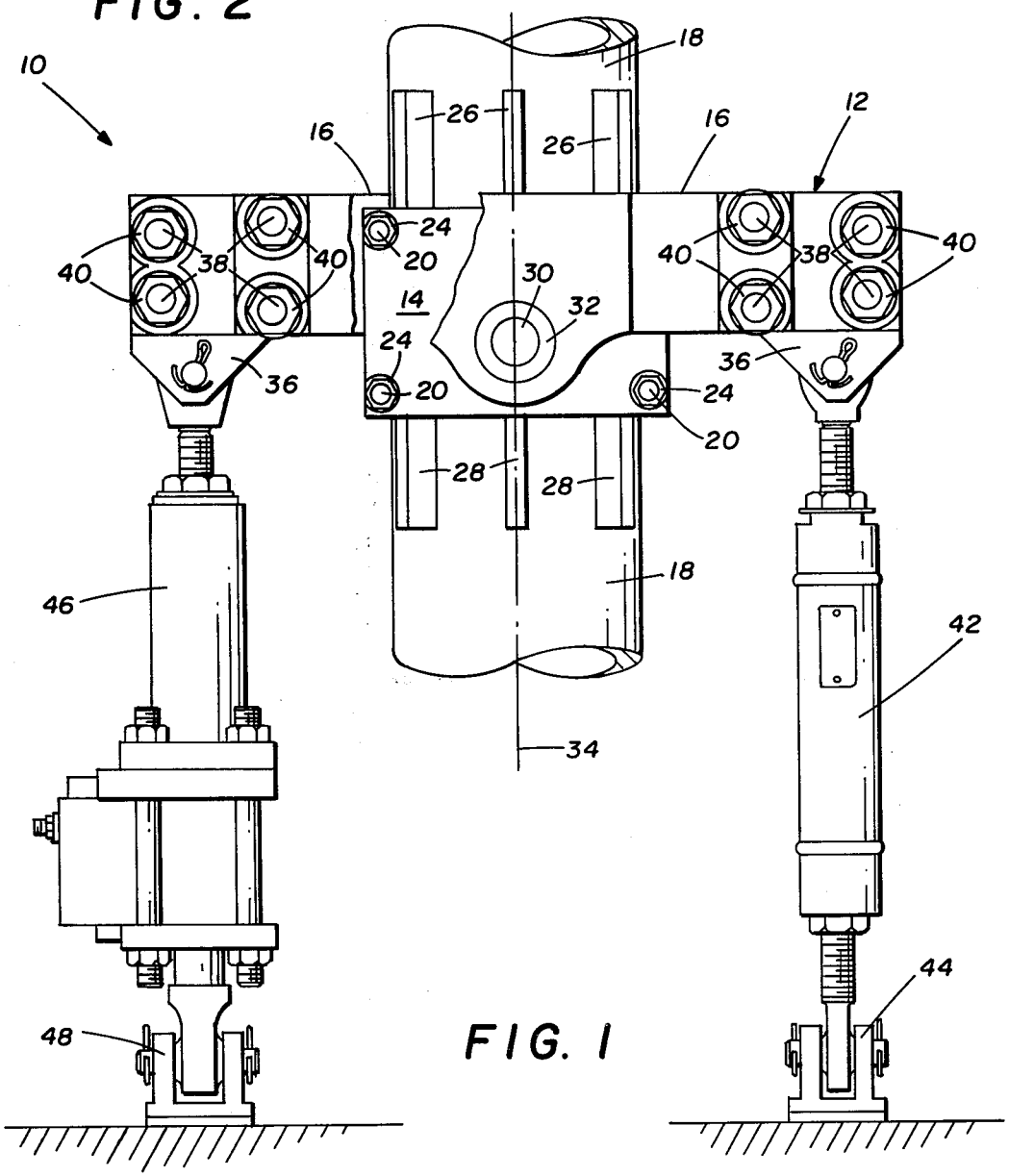
FIG. 1 is a side elevational view of the balanced snubber apparatus of the invention with certain parts broken away to illustrate more clearly certain features of the invention.

Referring now to the Drawings wherein like reference numerals designate like or corresponding parts throughout the views, there is shown the balanced snubber apparatus 10 incorporating the invention. The apparatus 10 is suitable for axially supporting an elongate member, such as a pipe, conduit or the like. In particular, the apparatus 10 is designed to permit ordinary axial movement of the pipe, with the pipe being locked in place in the event of a relatively larger displacement such as that accompanying a shock or blast. Use of the apparatus 10 thus minimizes shock damage to pipes and associated components. Moreover, the apparatus 10 provides support without effecting a bending moment reaction in the pipe.

The apparatus 10 includes a walking beam assembly 12. The walking beam assembly 12 is preferably constructed of a rigid structural material such as steel or iron, and is preferably of split construction. The assembly 12 is comprised of an inner portion 14 and an outer portion 16. The inner portion 14 is formed of two generally semi-cylindrical sections for engagement in surrounding relationship about a pipe or conduit 18. According to the preferred construction of the invention, the sections of inner portion 14 are tightly clamped together by means of threaded studs 20 and nuts 22. Preferably, a jam nut 24 is threadedly fastened over each nut 22 to prevent loosening of the inner portion 14.

Moreover, the inner portion 14 is preferably secured about the pipe 18 abutted between the upper shear lugs 26 and lower shear lugs 28 affixed in spaced circumferential relationship about the exterior surface of the pipe 18.

The inner portion 14 of the walking beam assembly 12 is pivotally interconnected with the outer portion 16. Preferably, the inner portion 14 includes a pair of opposed stubshafts 30 protruding outwardly from the inner portion 14 along a common line. Each stubshaft 30 is received in a bearing 32 mounted in one of the two sections comprising the outer portion 16. In accordance with the preferred construction of the invention, the bearings 32 are the self-aligning type. The stubshafts 30 and bearings 32 of the walking beam assembly 12 are positioned so that the portions 14 and 16 are pivotally interconnected about an axis extending substantially perpendicularly through the centerline 34 of the pipe 18.

The walking beam assembly 12 is supported at both ends in a direction substantially parallel to the centerline 34 of the pipe 18. In accordance with the preferred construction of the invention, a removable spacer 36 is secured between the two sections comprising the outer portion 16 at each end thereof. Four threaded studs 38 extending through each end of the outer portion 16 and one of the spacers 36, together with nuts 40, are employed to clampingly secure the spacers 36 within the walking beam assembly 12.

At one end of the assembly 12, a strut 42 is coupled between one spacer 36 and a suitable structural base. If desired, a rigid link of fixed length can be utilized for the strut 42. Preferably, the strut 42 comprises an adjustable length member of conventional construction to provide mounting versatility with respect to the suitable base available. It will be understood, however, that the strut 42 functions as a rigid link. One end of the strut 42 is pivotally connected to one of the spacers 36 in the walking beam assembly 12, while the other end is pivotally secured to a clevis 44 mounted on a suitable base. Preferably, self-aligning bearings are employed at the ends of the strut 42 to permit maximum freedom of movement and direct transmission of forces.

The other end of the walking beam assembly 12 is supported by a conventional snubber 46. As used herein the term "snubber" means a shock absorbing unit for dissipating the energy of a large force impulse. Generally, a snubber or shock absorber comprises a cylinder with a piston therein to define an extend chamber and a retract chamber. Fluid placed within the chambers of the cylinder dissipate shock energy through fluid friction and/or fluid compression. Preferably, the snubber 46 is a shock absorber of the type permitting predetermined relatively slow rates of displacement by means of internal fluid valving action. Due to this flow limiting action only displacement rates up to a predetermined maximum rate are permitted. Consequently, the snubber 46 locks up and effectively functions as a rigid member upon a relatively large shock or force impulse such as that caused by an earth tremor or blast. Providing that the lock-up rate is suitable, either a mechanical or a hydraulic device could be utilized for the snubber 46.

The snubber 46 is pivotally secured at one end to the other spacer 36 and at the other end to a clevis 48 mounted on a suitable base. Preferably, self-aligning bearings are utilized at the end connections of the snubber 46 to provide maximum freedom of movement and direct force transmission. Both the strut 42 and the snubber 46 are coupled to the walking beam assembly 12 at points displaced from the pivotal connection between the portions 14 and 16. Although the strut 42 and the snubber 46 can be positioned equidistant from the pivotal connection between the portions 14 and 16, it will be understood that this is not critical to the practice of the invention. The strut 42, snubber 46 and centerline 34 all lie in the same plane, and are preferably parallel.

The balanced snubber apparatus 10 operates as follows to provide longitudinal support for the pipe 18. Natural axial movement of the pipe 18 slower than the lock-up rate of the snubber 46 is allowed by the apparatus 10. Upon a large shock or impulse force, the snubber 46 becomes nonresponsive so that the pipe 18 is anchored in place by the apparatus 10 to minimize damage. The shock energy is thus dissipated in the snubber 46 and the shear lugs 26 and 28. The reaction forces of the apparatus 10 are applied equally through the centerline 34 of the pipe 18 so that no bending moment is induced in the pipe 18 either under normal axial loads or under shock loads.

In view of the foregoing, it will be appreciated that the present invention comprises a balanced snubber apparatus incorporating numerous advantages over the prior art. The apparatus permits some axial movement of the pipe, but locks the pipe in place in the event of shock to minimize damage to the support forces are reacted through the centerline of the pipe. Moreover, only one snubber is employed whereby reliability and maintainability are enhanced. Other advantages derived from the use of the invention will readily suggest themselves to those skilled in the art.

Although preferred embodiments of the invention have been illustrated in the accompanying Drawings and described in the foregoing Detailed Description, it will be understood that the invention is not limited to the embodiments disclosed, but is intended to embrace any alternatives, modifications, and substitutions or rearrangements of parts and/or elements as fall within the spirit and scope of the invention.

What is claimed is:

1. Apparatus for providing axial support to a pipe having a centerline and for suppressing axial shock loads in the pipe, said apparatus comprising:

a walking beam including an inner portion for attachment to the pipe, and an outer portion pivotally connected to the inner portion about an axis extending through the centerline of said pipe;

said inner and outer portions of the walking beam each comprising first and second sections secured to one another to facilitate attachment of said walking beam about said pipe;

a rigid link support pivotally connected to one side of the outer portion of said walking beam a predetermined distance from the pivotal connection between the inner and outer portions of said walking beam; and a snubber support means pivotally connected to the other side of the outer portion of the walking beam opposite to said rigid link support a predetermined distance from the pivotal connection between the inner and outer portions of said walking beam, said snubber support having a suitable predetermined lock-up rate so that the pipe is yieldably supported upon relatively small rates of axial displacement and rigidly supported upon relatively greater rates of axial displacement such as that caused by a shock.

2. Apparatus for axially supporting a pipe and suppressing shocks thereto, said pipe including a centerline and shear lug structure attached around the exterior of the pipe, which apparatus comprises:

a walking beam structure;

said walking beam structure including two symmetrical inside sections for clamping engagement about the pipe between the shear lug structure, two end spacers, and two symmetrical outside sections secured to one another through the end spacers;

each of the outside sections of the walking beam structure being pivotally connected to one of the inside sections thereof about an axis extending substantially perpendicularly through the centerline of the pipe;

a rigid link member located next to one side of the pipe and coupled between a suitable base and one of the end spacers in the walking beam structure a predetermined distance from the pivotal connection between the inside and outside sections of said walking beam structure; and a snubber support located next to the opposite side of the pipe and coupled between a suitable base and the other end spacer in the walking beam structure a predetermined distance from the pivotal connection between the inside and outside sections of said walking beam structure.

3. Apparatus for axially supporting an elongate member having a center line, comprising:

a walking beam including an inner portion for attachment to the elongate member, and an outer portion pivotally connected to the inner portion about an axis extending through the center line of said elongate member; and a pair of supports, each having a longitudinal axis coplanar with the center line of the elongate member and each being pivotally connected to the outer portion of said walking beam displaced in opposite relationship from the pivotal connection between the inner and outer portions thereof, one of said supports including snubber means for yieldably supporting the elongate member upon relatively small rates of axial displacement of said member, and rigidly supporting the elongate member in the event of a relatively greater rate of axial displacement such as that caused by a shock, the second support comprising a rigid link member coupled between a base and the walking beam.

4. The apparatus according to claim 1 wherein the length of the rigid link member is adjustable.

5. The apparatus of claim 1 wherein each portion of the walking beam is comprised of first and second symmetrical sections clamped to one another in surrounding engagement with the elongate member.

6. The apparatus of claim 1 wherein the outer portion of said walking beam comprises:

two symmetrical sections each pivotally connected to the inner portion;

two oblong spacers positioned between symmetrical sections with one of the supports being coupled to each spacer; and means for securing said symmetrical sections and spacers together.

* * * * *